July 12, 1927.
R. W. CANFIELD
1,635,704
METHOD OF MAKING HOLLOW GLASSWARE
Filed March 11, 1925
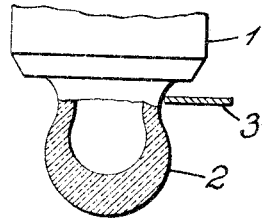
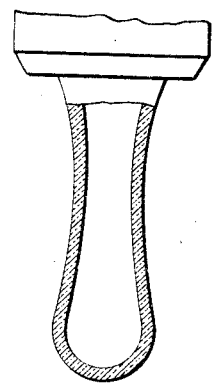
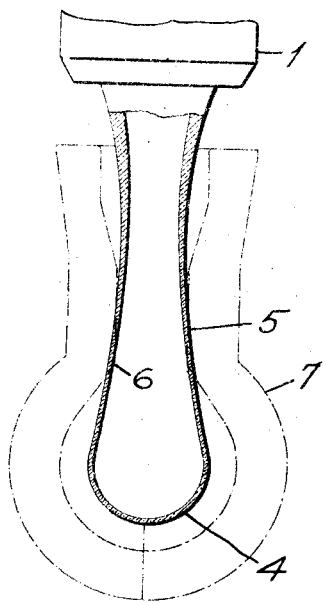
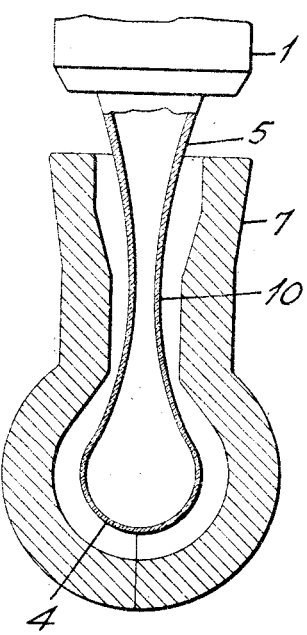
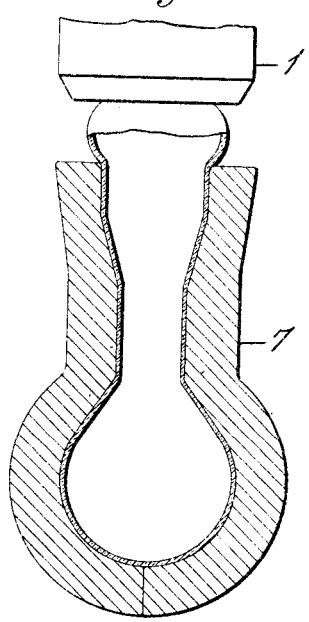
Witness:
S. P. Grotta
Inventor:
Robert W. Canfield
by Robert D. Brown
Atty.

Patented July 12, 1927.

1,635,704

UNITED STATES PATENT OFFICE.

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF MAKING HOLLOW GLASSWARE.

Application filed March 11, 1925. Serial No. 14,674.

The present invention relates to the manufacture of hollow glassware and it has particular relation to a method of making electric lamp bulbs having substantially spherical body portions and substantially cylindrical neck portions.

Heretofore, difficulty has been encountered in producing a bulb of this type by reason of the fact that the blank or parison, in stretching or elongating by its own weight or by blowing, naturally formed itself into an elongated pear shape, having no well-defined neck portion, the lower or body portion merging gradually into the upper or neck portion. When the blow mold was closed about such a parison, the portion of the mold where the neck joins the body portion presented an abrupt shoulder which would contact with and compress the parison and produce a permanent mark on the finished bulb at this point.

One of the objects of the present invention is to avoid the difficulty hereinabove mentioned by applying suction to the interior of the parison after it has been blown to the desired length and wall thickness in order to remove a portion of the air within the parison, thereby contracting the neck of the parison sufficiently to be enclosed in a blow mold without contact therewith.

In the drawing:

Figure 1 is a view in side elevation and section illustrating the parison at the beginning of the necking-in operation;

Fig. 2 is a similar view of the parison after the spinning or necking-in operation;

Fig. 3 is a similar view of the parison at the conclusion of the sagging or elongating operation, the blow mold being shown in dotted lines;

Fig. 4 is a similar view of the parison illustrating its contracted neck portion after the application of suction thereto and showing the clearance between the parison and the blow mold; and Fig. 5 is a similar view showing the bulb after being blown to final form in the blow mold.

According to an ordinary method of producing electric lamp bulbs, a charge of glass, obtained in any suitable manner, is first partially expanded by a blow head or blow pipe 1 to form a parison 2 of a substantially spherical shape (Fig. 1). The parison thus formed is then rotated by the blow head and is allowed to sag and elongate, during which operation a necking tool 3 is preferably applied to the parison to impart a preliminary configuration thereto.

As soon as the parison has sagged to substantially the shape shown in Fig. 2, the rotary movement and mechanical necking-in operations are discontinued and the parison is permitted to sag further and to elongate until the desired length and wall thickness are attained. At this stage (Fig. 3) the parison is of the elongated pear shape above referred to, and comprises a substantially hemispherical lower portion 4 and a substantially cylindrical neck portion 5 of slightly less diameter. It will be understood that blowing pressure may be continued throughout the foregoing stages of forming the parison.

At this stage the hemispherical lower portion 4 of the parison is approximately of the proper diameter to be enclosed in a blow mold, without contact therewith, but the neck portion 5 exceeds the diameter of the corresponding portion 6 of the blow mold 7, as is indicated by dotted lines in Fig. 3. If the mold were to be closed around the parison at this stage, the neck 6 of the blow mold 7 would contact with the neck 5 of the parison, producing a permanent mark thereon. In order, therefore, to reduce the diameter of this part of the parison sufficiently to be also enclosed in the blow mold without touching the walls thereof, suction is applied through the blowhead, which partially collapses and reduces the cross sectional area of the neck portion 5 of the parison, as indicated at 10 in Fig. 4.

The application of suction to the parison while reducing the diameter of the neck portion 5 does not destroy or distort the bulbous shape of the lower portion 4, or contract the diameter of the extreme upper portion of the neck 5 to any great extent. This is by reason of the fact that the lower portion 4 is laterally braced by its hemispherical bottom wall, which is somewhat cooler and of greater rigidity than the superjacent portions of the parison, having been extruded from the mass of glass a greater period of time, and the upper or neck portion 5 is laterally braced by the blowhead 1.

The blow mold 7 is then closed about the parison, as indicated in Fig. 4, and the rotation of the parison and the application of blowing pressure is resumed to blow the parison to final form, as illustrated in Fig. 5.

The application of suction to the parison before the mold closes around it reduces the neck portion to such an extent that ample clearance is provided between the parison and the walls of the blow mold, and the parison is thus shaped to a general contour substantially like that of the blow mold, thus enabling the parison to be blown to final form, without being marked or otherwise disfigured as in the method heretofore employed.

While in the foregoing description, the invention is described as being applied in the manufacture of electric lamp bulbs, it will be understood that it is also applicable in the manufacture of hollow glass articles of other types.

I claim:

1. The method of making hollow glassware, which comprises blowing a parison and then imparting a contracted neck portion thereto by removing a portion of the air contained therein, enclosing said parison in a mold, and blowing it to final form therein.

2. The method of making hollow glassware, which comprises blowing a parison and then pneumatically necking-in a portion thereof by producing a differential in the air pressure within and without the parison enclosing said parison in a mold, and blowing it to final form therein.

3. The method of making hollow glassware, which comprises blowing a parison, applying sub-atmospheric pressure to the interior of said parison to impart thereto a shape approximating the contour of the blow mold employed, enclosing the parison thus shaped in said blow mold, and blowing the parison to final form therein.

4. The method of making hollow glassware, which comprises blowing a parison and then applying suction to the interior of said parison to partially contract a portion thereof and to form a substantially spherical body portion and a substantially cylindrical neck portion, enclosing said parison in a mold, and blowing it to final form therein.

5. The method of making hollow glassware, which comprises blowing a parison having the desired wall thickness, applying suction to the interior of the parison to alter the shape thereof to conform substantially to the configuration of the blow mold, enclosing same in said mold and blowing the parison to final form therein.

6. The method of making an electric lamp bulb that comprises partially expanding a body of molten glass to form a parison of initially spheroidal shape, rotating said parison and permitting it to sag downward to an elongated pear shape, with optional application of a forming tool thereto, then applying suction to the interior of said parison to impart a contracted neck thereto, enclosing said parison in a blow mold, and expanding said parison to final form in said blow mold.

Signed at Hartford, Conn., this 10th day of March, 1925.

ROBERT W. CANFIELD.